| United States Patent [19] | [11] | 4,379,889 |
|---|---|---|
| Ashitaka et al. | [45] | Apr. 12, 1983 |

[54] PROCESS FOR PRODUCING POLYBUTADIENE RUBBER WITH ENHANCED MECHANICAL STRENGTH

[75] Inventors: Hidetomo Ashitaka; Kyohei Oizumi, both of Ichihara; Kazuya Jinda, Kisarazu; Kazutoshi Inaishi, Ichihara, all of Japan

[73] Assignee: Ube Industries, Ltd., Chiba, Japan

[21] Appl. No.: 216,869

[22] Filed: Dec. 16, 1980

[30] Foreign Application Priority Data

Dec. 20, 1979 [JP] Japan .................................. 54-164773

[51] Int. Cl.$^3$ ........................ C08F 4/12; C08F 136/06
[52] U.S. Cl. .................................................... 525/247
[58] Field of Search ..................... 526/340.4; 525/314, 525/247

[56] References Cited

U.S. PATENT DOCUMENTS

| 3,182,051 | 5/1965 | Marullo | 526/335 |
|---|---|---|---|
| 3,522,332 | 7/1970 | Ichikawa | 526/335 |
| 3,935,180 | 1/1976 | Lugiura et al. | 526/340.4 |
| 3,993,856 | 11/1956 | Halosa | 526/136 |
| 4,258,160 | 3/1981 | Haloso | 526/335 |
| 4,340,685 | 7/1982 | Takeuchi et al. | 525/247 |

*Primary Examiner*—Joseph L. Schofer
*Assistant Examiner*—Peter F. Kulkosky
*Attorney, Agent, or Firm*—Burgess, Ryan and Wayne

[57] ABSTRACT

A polybutadiene rubber having an enhanced mechanical strength is produced by a process comprising two successive steps of:

(A) cis-1,4-polymerizing 1,3-butadiene in a polymerization medium in the presence of a catalyst comprising a cobalt compound and a dialkyl aluminium halide of the formula (I): $AlR_2X$, wherein $R=C_2$-8 alkyl and $X=$halogen, and;

(B) subjecting a mixture of the resultant cis-1,4-polybutadiene and the non-reacted 1,3-butadiene in the polymerization medium to a 1,2-polymerization in the presence of a catalyst comprising a cobalt compound, a dialkyl aluminium halide of the formula (I), carbon disulfide and an electron donative organic compound.

17 Claims, No Drawings

PROCESS FOR PRODUCING POLYBUTADIENE RUBBER WITH ENHANCED MECHANICAL STRENGTH

FIELD OF THE INVENTION

The present invention relates to a process for producing a polybutadiene rubber with an enhanced mechanical strength.

BACKGROUND OF THE INVENTION

Japanese Patent Application Publication No. 49-17666 (1974) discloses a process for preparing a polybutadiene rubber with enhanced mechanical strength. This process comprises two successive polymerization steps in the first polymerization step a first polymerization mixture containing 1,3-butadiene and a polymerization medium is subjected to a polymerization in the presence of a cis-1,4-polymerization catalyst which has been prepared from a cobalt compound and a halogen-containing organic aluminum compound of the formula:

$$AlR_nX_{3-n}$$

wherein R represents a member selected from the group consisting of alkyl radicals having 1 to 6 carbon atoms, a phenyl radical and cycloalkyl radicals, X represents a halogen atom and n represents a numeral of from 1.5 to 2, to produce cis-1,4-polybutadiene, and; the second polymerization in which a second polymerization mixture containing the resultant first polymerization mixture and, optionally, both or either one of additional amounts of 1,3-butadiene and said polymerization medium, is subjected to a polymerization in the presence of a 1,2-polymerization catalyst which comprises (1) a cobalt compound, (2) an organic aluminum compound of the formula:

$$AlR_3$$

wherein R is as defined above, and (3) carbon disulfide, to prepare a polybutadiene rubber.

The above-mentioned process is disadvantageous in that the organic aluminum compound to be used as a component of the cis-1,4-polymerization catalyst is different from the organic aluminum compound to be used as a component of the 1,2-polymerization catalyst. That is, it is necessary to use two different types of aluminum compounds. This necessity causes the catalyst-preparation procedure to be complicated and costly. Therefore, it is preferable if a single type of aluminum compound can be used as a component of both the cis-1,4-polymerization catalyst and the 1,2-polymerization catalyst.

SUMMARY OF THE INVENTION

An object of the present invention is to provide a process for producing a polybutadiene rubber with an enhanced mechanical strength, by using a single type of aluminum compound as a component of both the cis-1,4-polymerization and 1,2-polymerization catalysts.

Other objects and advantages of the present invention will be apparent from the following description.

In accordance with the present invention, there is provided a process for producing a polybutadiene rubber with an enhanced mechanical strength, comprising two successive steps of:

(A) subjecting a first polymerization mixture comprising 1,3-butadiene and a polymerization medium to a first polymerization in the presence of a cis-1,4-polymerization catalyst which comprises (a) a cobalt compound soluble in said polymerization medium, and (b) a dialkyl aluminum halide of the formula (I):

$$AlR_2X \qquad (I)$$

wherein R represents an alkyl radical having 2 to 8 carbon atoms and X represents a halogen atom, to convert at least a portion of the amount of said 1,3-butadiene used to cis-1,4-polybutadiene, and;

(B) subjecting a second polymerization mixture comprising the resultant cis-1,4-polybutadiene, non-reacted 1,3-butadiene and said polymerization medium, to a second polymerization in the presence of a 1,2-polymerization catalyst which comprises:

(c) a cobalt compound soluble in said polymerization medium, (d) a dialkyl aluminum halide of said formula (I), (e) carbon disulfide and, (f) an electron donative organic compound, to convert said cis-1,4-polybutadiene and said 1,3-butadiene to a polybutadiene rubber.

DETAILED DESCRIPTION OF THE INVENTION

In the first step of the process of the present invention, a first polymerization mixture comprising 1,3-butadiene and a polymerization medium is subjected to a first polymerization procedure in the presence of a cis-1,4-polymerization catalyst, to convert at least a portion of the amount of the 1,3-butadiene used to a cis-1,4-polybutadiene.

The cis-1,4-polymerization catalyst comprises the elements of:

(a) a cobalt compound soluble in the polymerization medium and, (b) a dialkyl aluminum halide of the formula (I):

$$AlR_2X \qquad (I)$$

wherein R represents an alkyl radical having 2 to 8 carbon atoms and X represents a halogen atom.

The cobalt compound is not limited to a specific type of cobalt compound, as long as the cobalt compound is soluble in the polymerization medium. For example, the cobalt compound may be selected from a group consisting of cobalt complexes with β-diketones of the formula (II):

wherein $R^1$ and $R^2$ represent an aliphatic hydrocarbon radical having 1 to 3 carbon atoms, respectively, and $R^3$ and $R^4$ represent at least one member selected from the group consisting of a hydrogen atom and aliphatic hydrocarbon radicals having 1 to 3 carbon atoms, respectively; cobalt complexes with β-keto acid esters of the formula (III):

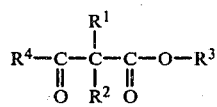

wherein $R^1$, $R^2$, $R^3$, and $R^4$ are as defined in preceding formula (II); cobalt salts of organic carboxylic acids having 6 or more carbon atoms, and; cobalt halide complexes of the formula (IV):

wherein X represents a halogen atom as defined above, n represents an integer of 2 or 3, Y represents an organic ligand capable of forming a complex in coordination with the cobalt halide (CoXn), m represents an integer of from 1 to 4.

Preferable examples of the cobalt-$\beta$-diketone complexes are cobalt (II) acetylacetonate and cobalt (III) acetylacetonate. A preferable example of the cobalt-$\beta$-keto acid ester is cobalt acetacetic ethyl ester. The cobalt salts of the organic carboxylic acids are preferably selected from a group consisting of cobalt octoate, cobalt naphthenate and cobalt benzoate.

In the cobalt halide complexes of the formula (IV), it is preferable that X represents a chlorine atom, and the organic ligand Y is selected from a group consisting of amine compounds, for example, pyridine, triethylamine, tributylamine and dimetyhlaniline; alcohol compounds, for instance methyl alcohol and ethyl alcohol and; N,N-dialkylamide compounds, for instance, N,N-dimethylformamide, N,N-dimethylacetamide and N,N-diethylformamide. Especially, it is preferable that the cobalt halide complex be a cobalt chloride-pyridine complex or a cobalt chloride-ethylalcohol complex.

The dialkyl aluminum halide of the formula (II) is preferably diethyl aluminum chloride.

In the first polymerization procedure, it is preferable that the cis-1,4-polymerization catalyst used contain 0.005 millimoles or more, more preferably, 0.01 millimoles or more, of the cobalt compound and 0.5 millimoles or more, more preferably, 1 millimole or more of the dialkyl aluminium halide, per mole of the 1,3-butadiene contained in the first polymerization mixture. Also, it is preferable that the molar ratio of the amount of the alkyl aluminum halide to the amount of the cobalt compound in the cis-1,4-polymerization catalyst is 5:1 or more, more preferably, 15:1 or more.

The polymerization medium to be contained in the first polymerization mixture can be selected from organic solvents capable of dissolving the cis-1,4-polybutadiene produced in the first polymerization procedure. The polymerzation medium may consist of at least one member selected from aromatic hydrocarbons, for example, benzene, toluene and xylene; aliphatic hydrocarbons, for example, n-heptane, and n-hexane; cycloaliphatic hydrocarbons, for example, cyclohexane, and; halogenated hydrocarbons, for example, chlorobenzene, o-dichlorobenzene, methylene chloride, 1,2-dichloroethane and 1,1,2-trichloroethane. It is preferable that the content of water in the polymerization medium be in the range of from 5 to 50 mg/l.

The first polymerization (cis-1,4-polymerization) procedure of 1,3-butadiene is preferably carried out at a temperature of from $-20°$ to $80°$ C., more preferably, from $20°$ to $70°$ C., under atmospheric pressure or higher, for a period of from 10 minutes to 5 hours. Also, it is preferable that the content of 1,3-butadiene in the first polymerization mixture is in a range of from 5 to 40% based on the entire weight of the first polymerization mixture.

The first polymerization (cis-1,4-polymerization) procedure is preferably carried out so that the resultant cis-1,4-polybutadiene contains 90% or more, more preferably, 95% or more of cis-1,4-structure and has an intrinsic viscosity of from 1 to 4, more preferably, 1.3 to 3, determined in toluene at a temperature of 30° C. In order to adjust the intrinsic viscosity of the resultant cis-1,4-polybutadiene to a desired value, the first polymerization mixture may be admixed with a molecular weight-regulating agent, for example, a non-conjugated diene compound, for instance, cyclooctadien (COD) or allene or an -olefin compound, for example, ethylene, propylene or butene-1.

In the second step of the process of the present invention, a second polymerization mixture comprising the resultant cis-1,4-polybutadiene, non-reacted 1,3-butadiene and the polymerization medium, are subjected to a second polymerization procedure in the presence of a 1,2-polymerization catalyst without deactivating the remaining cis-1,4-polymerization catalyst, to produce a polybutadiene rubber.

The second polymerization mixture may consist of the resultant first polymerization mixture alone, if it contains necessary amounts of non-reacted 1,3-butadiene and the polymerization medium. Otherwise, the second polymerization mixture is prepared by adding an additional amount of non-reacted 1,3-butadiene and/or an additional amount of the polymerization medium, to the resultant first polymerization mixture, so that necessary amounts of the resultant cis-1,4-polybutadiene, non-reacted 1,3-butadiene and the polymerization medium are contained in the second polymerization mixture.

The second polymerization is effected in the presence of an 1,2-polymerization catalyst which comprises:

(c) a cobalt compound soluble in the polymerization medium, (d) a dialkyl aluminum halide of the formula (I), (e) carbon disulfide and, (f) an electron donative organic compound.

The cobalt compound may be selected from the same group as that of the cobalt compounds usable for the cis-1,4-polymerization catalyst.

The dialkyl aluminum halide may be selected from the same group as that usable for the cis-1,4-polymerization catalyst.

The carbon disulfide is not limited to a specific grade. However, it is preferable that the carbon disulfide contain no water.

The electron donative organic compounds may include polyether compounds, for example, diethylene glycol dimethylether, diethylene glycol di-n-butylether and triethylene glycol dimethylether; aliphatic carboxylic esters, for example, dimethyl fumarate; aliphatic ketones, for example, acetone; aliphatic acetals, for example, acetaldehyde diethylacetal; aliphatic N,N-dialkylamides, for example, N,N-dimethyl formamide, N,N-dimethylacetamide; aliphatic dialkylsulfoxides, for example, dimethylsulfoxide and; trialkyl phosphates, for example, trimethyl phosphate. In the second polymerization procedure, it is preferable that the 1,2-polymerization catalyst used contain from 0.005 to 0.5 millimoles of the cobalt compound, from 0.1 to 50 millimoles of the dialkyl aluminium halide, from 0.01 to 10 millimoles of the carbon disulfide and from 0.05 to 5 millimoles of the electron donative organic compound, per mole of the non-reacted 1,3-butadiene contained in the second polymerization mixture. Also, it is preferable in the 1,2-polymerization catalyst that the molar ratio of the amount of the dialkyl aluminium halide to the amount of the cobalt compound be 5:1 or more, more preferably, 15~200:1. Furthermore, it is preferable that the electron donative organic compound be used in such an amount that the sum of the molar amounts of the electron donative organic compound and water contained in the second polymerization mixture be less than the molar amount of the dialkyl aluminum halide. Moreover, it is preferable that the content of the electron donative organic compound in the 1,2-polymerization catalyst be in the range of from 0.05 to 0.9 moles, more preferably, from 0.1 to 0.4 moles, per mole of the dialkyl aluminum halide.

The second polymerization procedure is preferably effected at a temperature of from $-20°$ to $80°$ C., more preferably, from $20°$ to $60°$ C., under atmospheric pressure or higher, for a period of from 10 minutes to 5 hours.

The polymerization medium to be contained in the second polymerization mixture may be the same as that in the first polymerization mixture.

In the process of the present invention, the first polymerization mixture may contain entire amounts of non-reacted 1,3-butadiene and the polymerization medium necessary for the production of the polybutadiene rubber. In this case, after the first polymerization procedure is completed, the entire amount of the resultant first polymerization mixture is used as a second polymerization mixture. In the other cases, the resultant first polymerization mixture is admixed with an additional amount of the non-reacted 1,3-butadiene and/or the polymerization medium so as to prepare the second polymerization mixture containing the necessary amounts of the cis-1,4-polybutadiene, non-reacted 1,3-butadiene and polymerization medium. In any cases, it is preferable that the content of the non-reacted 1,3-butadiene in the second polymerization mixture be in the range of from 3 to 40% by weight.

In the industrial practice of the process of the present invention, each of the first and second polymerizations may be carried out in a batch-type procedure. In this case, after the first polymerization is completed, the second polymerization may be carried out in the same reaction vessel as that in which the first polymerization was conducted. Also, the first polymerization is carried out continuously and, then, the second polymerization is effected continuously by using a continuous polymerization reactor having a first polymerization zone and a successive second polymerization zone.

After the second polymerization procedure is completed, the resultant polybutadiene rubber can be isolated from the reaction mixture by a known method. For example, after the second polymerization reaction is completed, in order to stop the second polymerization, a large amount of a polar solvent, for example, an alcohol or water, which is reactive to the dialkyl aluminium halide is added to the reaction mixture to deactivate the 1,2-polymerization mixture. In another method, the reaction mixture is poured into a large amount of the polar solvent. In still another method, a small amount of a polar solvent containing an inorganic acid, for example, hydrochloric acid or sulfuric acid; an organic acid, for example, acetic acid or benzoic acid, or monoethanolamine or ammonia, to the resultant reaction mixture. In another method, hydrogen chloride gas is introduced into the reaction mixture. After the second polymerization is stopped, the resultant polybutadiene rubber is precipitated from the reaction mixture by adding a precipitating agent, for example, methyl alcohol or by evaporating the polymerization medium from the reaction mixture. The evaporation of the polymerization medium may be carried out by blowing steam into the reaction mixture. The precipitated polymer is separated from the reaction mixture and, finally, dried.

In the process of the present invention, it is preferable that the amount of 1,3-butadiene cis-1,4-polymerized in the first polymerization procedure be in the range of 70 to 95% based on the entire weight of the polymerized 1,3-butadiene, and the amount of 1,3-butadiene 1,2-polymerized in the second polymerization procedure be in the range of from 5 to 30% based on the entire weight of the polymerized 1,3-butadiene in this process.

The polybutadiene rubber prepared in accordance with the process of the present invention comprises a boiling n-hexane-soluble fraction thereof having an intrinsic viscosity of from 1 to 5, determined in toluene at a temperature of $30°$ C. and containing 95% or more of a cis-1,4-structure and a boiling n-hexane-insoluble fraction thereof having a reduced viscosity of from 0.5 to 5, determined in tetrahydronaphthalene at a temperature of $135°$ C., and a melting point of $180°$ C. or more, and containing 85% or more of an 1,2-structure.

In the polybutadiene rubber, it is preferable that the amount of the boiling n-hexane-soluble fraction be in the range of from 70 to 95% by weight and the amount of the boiling n-hexane-insoluble fraction be in the range of from 5 to 30% by weight.

The polybutadiene rubber obtained in accordance with the process of the present invention can be vulcanized by a known vulcanizing method, and the resultant vulcanized rubber product, for example, tire can exhibit an excellent tear strength, flex-crack resistance and tensile strength.

The polybutadiene rubber produced in accordance with the process of the present invention may contain conventional additives, for example, vulcanizing agent, vulcanizing accelerator, reinforcing agent, filler, antioxidant, pigment, process oil and the like, which are usually blended with natural rubber or high cis-1,4-polybutadiene rubbers.

Also, the polybutadiene rubber of the present invention may be blended with natural rubber or other synthetic rubbers.

The polybutadiene rubber produced in accordance with the present invention has not only the same advantage and feature as those of cis-1,4-polybutadiene, but also, has greatly enhanced tear strength and flex-crack resistance when the polybutadiene rubber is vulcanized and converted into a final product.

The present invention will be further explained in the following examples and through comparative examples. In the examples and the comparative examples, the amount of the boiling n-hexane-insoluble fraction of the resultant polybutadiene rubber was determined in such a manner that 2 g of the polybutadiene rubber was immersed in 200 ml of n-hexane at a room temperature and extracted by using a Soxhet's extractor for 4 hours and, then, the non-extracted fraction was dried under vacuum. The weight of the dried fraction was measured.

The amount of the boiling n-hexane-soluble fraction of the resultant polybutadiene rubber was determined is such a manner that the resultant solution from the above-mentioned extraction procedure was subjected to a evaporation procedure in which the n-hexane is evaporated from the solution and, then, the residual fraction was dried under vacuum. The weight of the dried fraction was measured. The content of the boiling n-hexane-soluble fraction of the resultant polybutadiene rubber and the content of the cis-1,4-structure in the first polymerization product were determined by means of an infrared absorption spectrum analysis (IR). The content of the 1,2-structure in the boiling n-hexane-insoluble fraction of the polybutadiene rubber was determined by means of a nuclear magnetic resonance spectrum (NMR). The melting point of the boiling n-hexane-insoluble fraction of the polybutadiene rubber was determined from a temperature at a peak point appearing in an endothermic curve of the polybutadiene rubber measured by a recording differential scanning calorimeter (DSC).

The intrinsic viscosities [$\eta$] of the boiling n-hexane-soluble fraction of the polybutadiene rubber and the first polymerization product (cis-1,4-polymer) were determined in toluene at a temperature of 30° C. Also, the reduced viscosity of the boiling n-hexane-insoluble fraction of the polybutadiene rubber was determined in tetrahydronaphthalene at a temperature of 135° C.

EXAMPLE 1

A solution of 74.8 g of dried 1,3-butadiene in 764 ml of dehydrated benzene was placed in a two liter four neck separable flask with a thermometer, a stirrer and a conduit for introducing therein nitrogen gas, which flask was filled with nitrogen gas. The 1,3-butadiene solution contained 0.64 millimoles of water.

While maintaining the temperature of the 1,3-butadiene solution at a level of 30° C., 4 millimoles of diethyl aluminum chloride, 4.2 millimoles of COD and 0.017 millimoles of cobalt octoate were mixed with the 1,3-butadiene solution. The mixture was stirred at a temperature of 30° C. for 30 minutes to subjected the 1,3-butadiene to a cis-1,4-polymerization (the first polymerization procedure). The resultant cis-1,4-polybutadiene exhibited an intrinsic viscosity of 2.90.

Just after the cis-1,4-polymerization was completed, 0.3 millimoles of carbon disulfide, 1.2 millimoles of acetone and 0.1 millimole of cobalt octoate were admixed with the resultant first polymerization mixture. The admixture was stirred at a temperature of 30° C. for 30 minutes so as to allow the non-reacted 1,3-butadiene in the admixture to 1,2-polymerize.

The resultant second reaction mixture was poured into a solution containing small amounts of 2,6-di-tert-butyl-4-methylphenol and hydrochloric acid in 1 liter of methyl alcohol, so as to stop the 1,2-polymerization and to allow the resultant rubber polymer to precipitate from the admixture. The rubber polymer was separated from the admixture, washed with methyl alcohol and, then, dried in a vacuum at a temperature of 50° C.

The resultant polybutadiene rubber was obtained at a yeild of 59%.

The polybutadiene rubber contained 9.8% by weight of a boiling n-hexane-insoluble fraction thereof which exhibited a reduced viscosity of 1.56 and a melting point of 198° C. and contained 90% or more of 1,2-structure, and the balance consisting of a boiling n-hexane-soluble fraction thereof which exhibited an intrinsic viscosity of 2.9 and contained 96% of cis-1,4-structure.

EXAMPLE 2

The air in an one liter stainless steel autoclave equiped with a thermometer, a stirrer, a conduit for introducing a catalyst and a conduit for blowing in nitrogen gas, was replaced with nitrogen gas. The autoclave was charged with a solution of 153 g of dried 1,3-butadiene in 553 ml of dehydrated benzene. The solution contained 0.53 millimoles of water. The solution was mixed with 4.6 millimoles of diethyl aluminum chloride, 18.5 millimoles of COD and 0.02 millimoles of cobalt octoate. The mixture was stirred at a temperature of 40° C. for 30 minutes to allow the 1,3-butadiene to cis-1,4-polymerize. The resultant polymer had an intrinsic viscosity of 1.75. Right after the completion of the cis-1,4-polymerization, the mixture was admixed with 0.3 millimoles of carbon disulfide, 1.3 millimoles of diethylene glycol di-n-butyl ether and 0.6 millimoles of cobalt octoate. The admixture was stirred at a temperature of 40° C. for 30 minutes so as to allow the non-polymerized 1,3-butadiene to 1,2-polymerize. The 1,2-polymerization was stopped by the same method as that described in Example 1, and the resultant polybutadiene rubber was isolated in the same manner as that described in Example 1. The polybutadiene rubber was obtained at a yield of 66% and contained 13.3% by weight of a boiling n-hexane-insoluble fraction thereof which had a reduced viscosity of 1.85 and a melting point of 188° C. and contained 90% or more of the 1,2-structure, and; the balance consisting of a boiling n-hexane-soluble fraction thereof which had an intrinsic viscosity of 1.75 and contained 97.6% of the cis-1,4-structure.

EXAMPLE 3

The same procedures as those described in Example 2, were carried out, except that the diethylene glycol di-n-butyl ether was replaced by dimethyl fumarate. A polybutadiene rubber was obtained at a yield of 62% and contained 12.5% of a boiling n-hexane-insoluble fraction thereof which had a melting point of 188° C.

EXAMPLE 4

The same procedures as those described in Example 2 were carried out, except that the diethylene glycol di-n-butyl ether was replaced by N,N-dimethyl formamide. The resultant polybutadiene rubber was obtained at a yield of 63% and contained 13.0% of a boiling n-hexane-insoluble fraction thereof which had a melting point of 190° C.

EXAMPLE 5

The same procedures as those described in Example 2 were carried out, except that the diethylene-glycol di-n-butyl ether was replaced by N,N-dimethyl sulfoxide.

The resultant polybutadiene rubber was obtained at a yield of 59% and contained 11.5% of a boiling n-hexane-insoluble fraction thereof which had a melting point of 191° C.

Comparative Example 1

Procedures identical to those described in Example 1 were carried out, except that after the cis-1,4-polymerization was completed, no acetone, carbon disulfide or cobalt octoate were admixed to the polymerization mixture, and the 1,2-polymerization was carried out at a temperature of 30° C. for 30 minutes.

As a result, a cis-1,4-polybutadiene was obtained at a yield of 68%. This cis-1,4-polybutadiene had an intrinsic viscosity of 2.75 and contained 1.2% of 1,2-structure, 0.7% of trans-1,4-structure and 98.1% of cis-1,4-structure.

EXAMPLE 6

A four neck separable flask having a capacity of 10 liters and equiped with a thermometer, a stirrer and a conduit for blowing-in nitrogen gas, was filled with the nitrogen gas and, then, charged with a solution of 425 g of dried 1,3-butadiene in 4300 ml of dehydrated benzene. The solution contained 3.7 millimoles of water. The solution was mixed with 22.1 millimoles of diethyl aluminum chloride, 37.5 millimoles of COD, and 0.215 millimoles of cobalt octoate, while the temperature of the solution was maintained at 35° C. The mixture was stirred at the temperature of 35° C. for 40 minutes so as to cis-1,4-polymerize the 1,3-butadiene. The resultant polymer exhibited an intrinsic viscosity of 1.70. The resultant polymer mixture was cooled to 15° C. and, then, admixed with 6.6 millimoles of diethylene glycol di-n-butyl ether, 250 g of 1,3-butadiene, 0.675 millimoles of cobalt octoate and, 1 millimole of carbon disulfide. The admixture was stirred at 15° C. for 30 minutes to 1,2-polymerize the 1,3-butadiene.

In order to stop the 1,2-polymerization, four liters of a methyl alcohol solution containing small amounts of 2,6-di-tert-butyl-4-methylphenol and hydrochloric acid were added to the admixture. The resultant polybutadiene rubber was precipitated and separated from the admixture, washed with methyl alcohol and, finally, dried at a temperature of 50° C. in a vacuum.

The dried polybutadiene rubber was obtained at a yield of 56% and contained 11.9% of a boiling n-hexane-insoluble fraction thereof having a reduced viscosity of 1.86 and a melting point of 198° C. and containing 90% or more of the 1,2-structure and; the balance consisting of a boiling n-hexane-soluble fraction thereof having an intrinsic viscosity of 1.7 and containing 96.6% of the cis-1,4-structure.

The polybutadiene rubber was converted into a composition as indicated below.

| Component | Amount (part by weight) |
|---|---|
| Polybutadiene rubber | 100 |
| HAF Carbon* | 50 |
| Naphthene type process oil | 10 |
| Zinc oxide | 5 |
| Stearic acid | 2 |
| Amine type autioxidant | 1 |
| Cyclohexyl-benzothiazyl sulphenamide | 1 |
| Sulphur | 1.5 |

Note:
*Oil absorption: 80 g per 100 g of the carbon
Surface area: 85 m² per g of the carbon particles The composition was uniformly mixed by using a Brabender plastograph having a capacity of 60 ml and, then, by using a roll mixer, and vulcanized at a temperature of 140° C. for 30 minutes. The vulcanizing procedure was applied to a portion of the composition which was subjected to the measurement of a flex-crack resistance of the vulcanized composition, at 140° C. for 75 minutes. The properties of the vulcanized composition was determined in accordance with Japanese Industrial Standard K-6301. For the purpose of comparison, the same procedures as those mentioned above were carried out, except that the polybutadiene rubber was replaced by a commercially available high cis-1,4-polybutadiene.

The properties of the vulcanized composition of the present example and the comparative vulcanized composition are indicated in Table 1.

TABLE 1

| Item | The present example | Comparative composition |
|---|---|---|
| Hardness | 72 | 56 |
| 300% modulus (kg/cm²) | 129 | 72 |
| Ultimate elongation (%) | 420 | 570 |
| Tensile strength (kg/cm²) | 170 | 175 |
| Tear strength (kg/cm²)(*)$_1$ | 60 | 33 |
| Impact resilience (%) | 57 | 65 |
| Flex-crack resistance (*)$_2$ | >200,000 | 1,600 |

Note:
(*)$_1$ The tear strength was measured in accordance with B-type test method described in JIS K-6301.
(*)$_2$ The flex-crack resistance was represented by the number of flexing operations at which the length of a crack created in a testing specimen reached from 2 mm to 15 mm.

We claim:

1. A process for producing a polybutadiene rubber with enhanced mechanical strength, comprising the two successive steps of:

(A) polymerizing a first polymerization mixture comprising 1,3-butadiene and a polymerization medium in the presence of a cis-1,4-polymerization catalyst which comprises:

(1) a cobalt compound selected from the group consisting of cobalt complexes with beta-diketones of the formula (II):

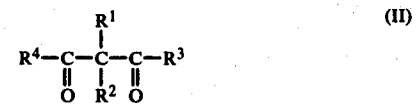

wherein $R^1$ and $R^2$ represent an aliphatic hydrocarbon radical having 1 to 3 carbon atoms, respectively, and $R^3$ and $R^4$ represent at least one member selected from the group consisting of a hydrogen atom and an aliphatic hydrocarbon radical having 1 to 3 carbon atoms, respectively; a cobalt complex with β-keto acid esters of formula (III):

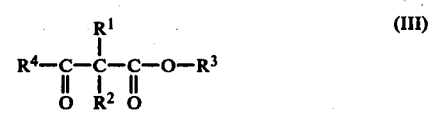

wherein $R^1$, $R^2$, $R^3$ and $R^4$ are as defined above; cobalt salts of an organic carboxylic acid having 6 or more carbon atoms; and a cobalt halide complex of the formula (IV):

wherein X represents a halogen atom, n represents an integer of 2 or 3, Y represents an organic ligand capable of forming a complex in coordination with the cobalt halide and m represents an integer of from 1 to 4, and (2) a dialkyl aluminum halide of the formula (I):

wherein R represents an alkyl radical having 2 to 8 carbon atoms and X represents a halogen atom, to convert at least a portion of the amount of said 1,3-butadiene to a cis-1,4-polybutadiene; and (B) polymerizing a second polymerization mixture comprising the resultant cis-1,4-polybutadiene from Step (A), unreacted 1,3-butadiene and a polymerization medium in the presence of a 1,2-polymerization catalyst which comprises:

1. said cobalt compound;
2. said dialkyl aluminum halide;
3. carbon disulfide; and
4. an electron donor organic compound selected from the group consisting of an aliphatic polyether, an aliphatic carboxylic ester, an aliphatic ketone, an aliphatic acetal, an aliphatic N,N-dialkyl amide, an aliphatic dialkyl sulfoxide and a trialkyl phosphate, to convert said cis-1,4-polybutadiene and said 1,3-butadiene to a polybutadiene rubber, whereby the resultant polybutadiene rubber comprises 70% to 95% by weight of a boiling n-hexane-soluble fraction thereof having an intrinsic viscosity of from 1 to 5 determined in toluene at a temperature of 30° C. and containing 95% or more of a cis-1,4-structure, and 5% to 30% by weight of a boiling n-hexane-insoluble fraction having a reduced viscosity of from 0.5 to 5, determined in tetrahydronaphthalene at a temperature of 135° C., and a melting point of 180° C. or more, and containing 85% or more of a 1,2-structure.

2. A process as claimed in claim 1, wherein said dialkyl aluminium halide of the formula (I) is diethyl aluminium chloride.

3. A process as claimed in claim 1, wherein said cis-1,4-polymerization catalyst used contains 0.005 millimoles or more of said cobalt compound and 0.5 millimoles or more of said dialkyl aluminium halide per mole of said 1,3-butadiene contained in said first polymerization mixture.

4. A process as claimed in claim 1, wherein the molar ratio of the amount of said dialkyl aluminium halide to the amount of said cobalt compound in said cis-1,4-polymerization catalyst is 5:1 or more.

5. A process as claimed in claim 1, wherein said first polymerization medium is an organic solvent capable of dissolving said cis-1,4-polybutadiene.

6. A process as claimed in claim 5, wherein said first polymerization medium contains 5 to 50 mg/l of water.

7. A process as claimed in claim 1, wherein said first polymerization is carried out at a temperature of from −20° to 80° C.

8. A process as claimed in claim 1, wherein the content of 1,3-butadiene in said first polymerization mixture is in the range of from 5 to 40% based on the entire weight of the first polymerization mixture.

9. A process as claimed in claim 1, wherein the resultant cis-1,4-polybutadiene contains 90% or more of cis-1,4-structure, and has an intrinsic viscosity of from 1 to 4, determined in toluene at a temperature of 30° C.

10. A process as claimed in claim 1, wherein said carbon disulfide contains substantially no water.

11. A process as claimed in claim 1, wherein said 1,2-polymerization catalyst used contains from 0.005 to 0.5 millimoles of said cobalt compound, from 0.1 to 50 millimoles of said dialkyl aluminium halide, from 0.01 to 10 millimoles of said carbon disulfide and from 0.05 to 5 millimoles of said electron donative organic compound, per mole of the non-reacted 1,3-butadiene used.

12. A process as claimed in claim 1, wherein said 1,2-polymerization catalyst, the molar ratio of the amount of said dialkyl aluminium halide to the amount of said cobalt compound is 5:1 or more.

13. A process as claimed in claim 1, wherein the sum of the molar amounts of said electron donative organic compound and water contained in said second polymerization mixture is less than the molar amount of said dialkyl aluminium halide.

14. A process as claimed in claim 1, wherein said second polymerization is carried out at a temperature of from −20° to 80° C.

15. A process as claimed in claim 1, wherein the content of the non-reacted 1,3-butadiene in said second polymerization mixture is in the range of from 3 to 40% by weight.

16. A process as claimed in claim 1, wherein the amount of 1,3-butadiene cis-1,4-polymerized in said first polymerization is in the range of 70 to 95% based on the entire weight of the polymerized 1,3-butadiene in this process.

17. A process as claimed in claim 1, wherein the amount of 1,3-butadiene 1,2-polymerized in said second polymerization is in the range of 5 to 30% based on the entire weight of the polymerized 1,3-butadiene in this process.

* * * * *